April 11, 1939.  E. BECKER  2,154,146

ELECTRIC MOTOR, DYNAMO, AND THE LIKE

Filed Nov. 15, 1937

Inventor
Emil Becker
by Charles B. Church
Atty

Patented Apr. 11, 1939

2,154,146

UNITED STATES PATENT OFFICE 2,154,146

ELECTRIC MOTOR, DYNAMO, AND THE LIKE

Emil Becker, Munich, Germany, assignor to John Edward Becker, Stoney Creek, Ontario, Canada Application November 15, 1937, Serial No. 174,634
In Germany September 2, 1935

7 Claims. (Cl. 172—252)

My invention relates to improvements in electric motors and the like, and the object of the invention is to provide a light sheet metal housing for the stator laminations in place of the cast iron housings now in general use. With the exception of the stator and rotor assembly, the essential parts of an electric motor or generator are generally made of cast iron of comparatively heavy construction to obtain the desired strength.

A further object of my invention is to house the stator and rotor assembly within a pair of thin sheet metal shields which can be died out with great precision and high speed production, and in which operations such as facing, boring, turning and grinding are, in most cases, entirely eliminated.

Another object of my invention is to slit the shields axially near their clamping points and to tighten them circumferentially around the stator by clamping bands or turn-buckles, or in the case of the use of non-slitted shields, to press expanding wedge rings axially between the laminations of the stator and shields. Either of these fastening constructions provides a very strong anchorage which is necessary to withstand the electromagnetic forces between the stator and rotor. Another valuable detail in the clamping bands or the like is afforded by the arrangement of feet on the bands, thus carrying all forces acting upon the feet in the shortest possible way through to the stator laminations where the torque is generated.

A still further object of my invention is to provide a valuable construction in shields with double walls with inner stiffeners for extra strength, or in certain cases of single walled shields, to furnish double end walls of substantially inner conical shape, such walls being preferably reinforced by ventilating openings therein and having upturned edges.

Another object of the invention is to provide slash-proof air cooling of the interior of the motor by arranging louvre-like orifices in the ends of double walls and in which the louvres in the outer wall are staggered in respect to the louvres in the inner wall.

With these and other objects in view, my invention consists in providing housing shields for electric motors and the like, all as hereinafter more particularly described and illustrated in the accompanying drawing in which.

Like characters of reference indicate corresponding parts in the different views of the drawing.

Figure 1:
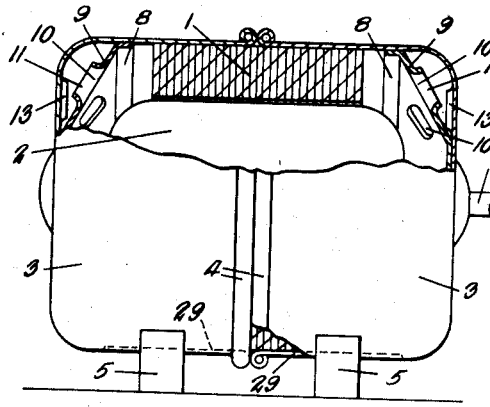
Figure 1 is a side elevational view of a small electric motor wherein the stator is housed within two pressed metal shields, part of the shields being broken away to disclose the interior construction.
Figure 2:
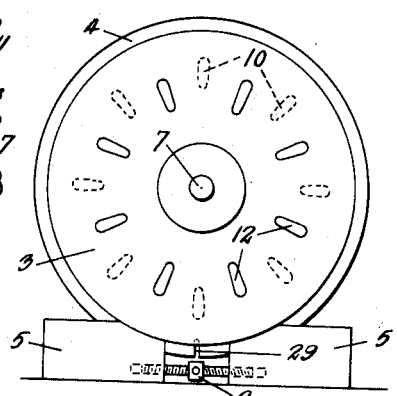
Figure 2 is an end elevational view of the motor as illustrated in Figure 1.

In Figures 1 and 2 I show a small electric motor having the usual laminated stator 1 and rotor 2. In this construction the laminated stator 1 is contained within a pair of cup-shaped sheet metal housings 3 of substantially identical shape and pressed or died into form. The inner edges 4 of the housings are rolled up and abut one another.

The housings are slitted axially in their lower portions and are each furnished with a pair of feet 5 positioned upon either side of the slits 29. The feet are welded or otherwise secured to the housings and may be pulled together, to tighten the housings around the stator, by means of a turn-buckle 6 threaded into and extending between the feet. The axial spindle 7 of the rotor 2 is carried within suitable bearings provided in the ends of the housings 3. The housings 3 can be reinforced at their ends with double walls, as illustrated in Figure 1. The inner walls thus provided each consist of a truncated conical shaped member 8 of substantially the same diameter as the inner diameter of the housings, and formed with their inclined portions extending between the ends of the housings and the circular walls of the housings. The members 8 are a tightly pressed fit into the housings 3. The inclined portions 9 of the members 8 are preferably formed with a plurality of radially positioned orifices 10 having upturned edges 11. The upturned edges 11 are formed to add strength to the members 8.

The ends of the housings 3 are also formed with a plurality of radially disposed orifices 12, such orifices also being formed with turned in edges 13 for strengthening purposes. The orifices 10 and 12 are staggered in relation to one another and thus provide for the circulation of cooling air, but prevent water or other foreign matter from readily finding its way into the interior of the housings 3.

Figure 3:
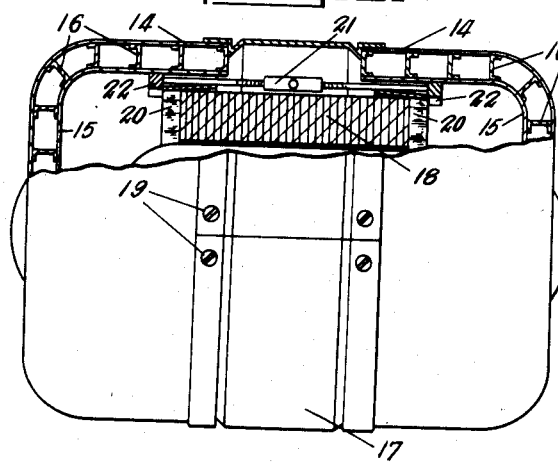
Figure 3 is a side elevational view, partly broken away, of a motor provided with double sheet metal shield walls together with a central circumferential band positioned between the inner edges of the shields and surrounding the central portion of the stator.
Figure 4:
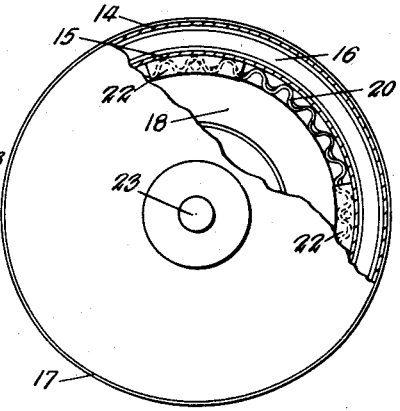
Figure 4 is an end elevational view of the motor as shown in Figure 3, part of the shield being broken away to disclose a circumferential wedge ring used in this construction, and, Figure 5 is an end elevational view of a clamping band as may be used in conjunction with my shields, as illustrated in Figure 1.

In Figures 3 and 4 I show my same principle of construction as designed for larger sizes of motors and wherein the outer cup-shaped died sheet metal walls 14 are reinforced by inner cup-shaped died out sheet metal walls 15. The walls 14 and 15 are retained in their spaced relationship and further strengthened by a plurality of stiffening and spacing rings 16 which extend around and between the walls 14 and 15. The rings 16 are preferably made of channel cross-section for extra strength and also to provide sufficient bearing surface between the rings and the walls. The rings are welded or otherwise secured in place between the walls. The provision of the rings between the pair of walls makes a very rigid construction and enables the housings to carry very great tensional and buckling loads.

Upon reference to Figure 3, it will be seen that in this case I do not necessarily make the housings of sufficient depth that they abut one another at their inner ends, but furnish a central ring 17 which surrounds the central portion of the stator 18 and overlaps the ends of the outer walls 14. The ring is split axially and can be secured in place in any suitable manner as by the screws 19 extending through the ring into the outer wall 14. In this construction the connection between the stator 18 and inner walls 15 is carried out by a pair of corrugated tapered rings 20 which extend around the end portions of the stator and are wedged between the stator and the inner wall 15.

The tapered corrugated rings 20 are drawn tightly into their wedging position by the provision of a plurality of turn-buckles 21, the ends of such turn-buckles extending through the corrugations and provided with broad heads 22 which engage the edges of the rings remote from the center of the stator, and thus as the turn-buckles are tightened up, the corrugated rings are drawn towards one another and tightly wedge themselves between the inner housing walls 15 and the stator. After the corrugated rings 20 have been tightly drawn into place by the turn-buckles 21, the central ring 17 is positioned and secured in place.

The axial spindle 23 of the rotor is suitably supported within bearings furnished in the ends of the double walled housings. In making the rings 20 of corrugated form I provide a form of wedge which readily adapts itself to being drawn into a tight position between the housing and the stator, and at the same time, due to the corrugations, a large number of air passages are formed between the central and outer portions of the motor casing.

Figure 5:
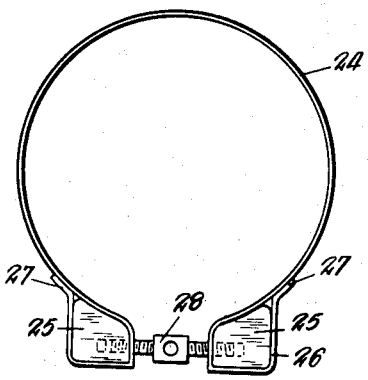

In Figure 5, I illustrate a circular draw band 24 which can be used in place of the draw-buckle and feet assembly as illustrated in Figures 1 and 2, or used upon the construction as illustrated in Figures 3 and 4. The band 24 is preferably formed to carry a pair of feet blocks 25 which are positioned within loops 26 formed by the free ends of the band, such loops surrounding the blocks and having their free ends 27 welded or otherwise attached to the outer face of the band. The blocks are connected by a turn-buckle 28 which when drawn up tightens the band around its housing and thus tightens the housing upon the stator.

From the foregoing description it will be seen that I have provided a very simple form of housing for electric motors, dynamos and the like, wherein such housing members, although being formed of comparatively light died out sheet metal, are of considerable strength and can be readily removed for inspection or repair purposes. Furthermore, by furnishing the housing with ventilating orifices, which, of course, can be done with my construction as shown in Figure 3 as well as in the construction shown in Figure 1, and by utilizing the upturned edges of such orifices as a means for strengthening the housings, I have provided a construction wherein the desired ventilation and strength of construction is obtained. Although I have shown a preferred construction of my invention, it is to be understood that I can make such changes and alterations as I may from time to time deem necessary without departing from the spirit of my invention as set forth in the appended claims.

What I claim as my invention is:

1. In an electric machine of the character described and including a stator, of a substantially cup-shaped sheet metal housing assembly surrounding the stator, and a corrugated wedge ring adjustably interposed between the stator and the housing to retain the stator against movement relative to the housing.

2. In an electric machine of the character described and including a stator, of a pair of substantially cup-shaped sheet metal housing assemblies each surrounding an end portion of the stator, a pair of wedge rings each interposed between a housing and the stator, and means for drawing the wedge rings towards one another and into wedging engagement between the stator and the housings.

3. In an electric machine of the character described and including a stator, of a pair of substantially cup-shaped sheet metal housing assemblies each surrounding an end portion of the stator, a pair of corrugated wedge rings each interposed between a housing and an end portion of the stator, and a plurality of screw elements spaced around the stator and connecting the wedge rings for drawing them towards one another and into wedging engagement between the stator and the housings.

4. In an electric machine of the character described and including a stator, of a pair of double walled sheet metal housing assemblies each surrounding an end portion of the stator and formed with air cooling louvres, the louvres in the outer wall being staggered in relation to the louvres in the inner wall, and means for clamping the housing assemblies circumferentially around the stator to retain the stator against movement relative to the housing assembly.

5. In an electric machine of the character described and including a stator, of a pair of double walled sheet metal housing assemblies each surrounding an end portion of the stator and formed with air cooling louvres, the louvres in the outer wall being staggered in relation to the louvres in the inner wall, a pair of corrugated wedge rings each interposed between a housing and an end portion of the stator, a plurality of screw elements spaced around the stator and connecting the wedge rings for drawing them towards one another and into wedging engagement between the stator and the housings, and a cover positioned at the central portion of the stator between the inner ends of the housing assemblies.

6. In an electric machine of the character described and including a stator, of a pair of double walled sheet metal housing assemblies each surrounding an end portion of the stator and formed with air cooling louvres, the louvres in the outer wall being staggered in relation to the louvres in the inner wall, a plurality of stiffening and spacing members arranged in the hollow space between the double walls, a pair of corrugated wedge rings each interposed between a housing and an end portion of the stator, a plurality of screw elements spaced around the stator and connecting the wedge rings for drawing them towards one another and into wedging engagement between the stator and the housings, and a cover positioned at the central portion of the stator between the inner ends of the housing assemblies.

7. In an electric machine of the character described and including a stator, of a pair of double walled sheet metal housing assemblies each surrounding an end portion of the stator and formed with air cooling louvres, the louvres in the outer wall being staggered in relation to the louvres in the inner wall, the louvres in the outer wall being formed with in-turned edges and the louvres in the inner wall being formed with out-turned edges, and means for clamping the housing assemblies circumferentially around the stator to retain the stator against movement relative to the housing assembly.

EMIL BECKER.